United States Patent [19]

Cawlfield et al.

[11] Patent Number: 4,810,483

[45] Date of Patent: Mar. 7, 1989

[54] PROCESS FOR PRODUCING ANHYDROUS ALKALI METAL HYDROSULFITES

[75] Inventors: David W. Cawlfield, Cleveland; Roger E. Bolick, II, Chattanooga, both of Tenn.; Joan A. Mabesoone, Chester, Va.

[73] Assignee: Olin Corporation, Cheshire, Conn.

[21] Appl. No.: 56,040

[22] Filed: Jun. 1, 1987

[51] Int. Cl.$^4$ .............................................. C01B 17/45
[52] U.S. Cl. ................................ 423/512 R; 423/511; 423/512 A; 423/515; 423/516
[58] Field of Search ............... 423/511, 512 R, 512 A, 423/515, 516

[56] References Cited

U.S. PATENT DOCUMENTS

| | | | |
|---|---|---|---|
| 795,755 | 7/1905 | Bazlen | 423/515 |
| 2,938,771 | 5/1960 | Avedikian | 423/516 |
| 3,298,796 | 1/1967 | Van Damme-Van Weele et al. | 23/302 |
| 4,590,058 | 5/1986 | Cawlfield | 423/515 |
| 4,676,961 | 6/1987 | Appl et al. | 423/515 |

FOREIGN PATENT DOCUMENTS 69-12013  9/1964  Japan.
45-016326 6/1970  Japan ................................ 423/515

Primary Examiner—William R. Dixon, Jr.
Assistant Examiner—Anthony J. Green
Attorney, Agent, or Firm—James B. Haglind

[57] ABSTRACT

A process for producing an anhydrous alkali metal hydrosulfite comprises contacting hydrate crystals of an alkali metal hydrosulfite with an alkaline aqueous solution of a dehydrating agent having a pH of at least about 7. The slurry formed is maintained at or above the transition temperature to covert the hydrate crystals to anhydrous crystals of the alkali metal hydrosulfite. The process permits the conversion of hydrate crystals to produce anhydrous crystals of alkali metal hydrosulfite without substantial dissolving or decomposition of the alkali metal hydrosulfite.

13 Claims, No Drawings

PROCESS FOR PRODUCING ANHYDROUS ALKALI METAL HYDROSULFITES

This invention relates to a process for producing alkali metal hydrosulfites. More specifically, this invention relates to a process for producing anhydrous alkali metal hydrosulfite crystals containing reduced amounts of undesirable impurities.

Alkali metal hydrosulfites are commercially available bleaching agents which are particularly suitable for use in the textile, pulp and paper, and clay industries.

Anhydrous alkali metal hydrosulfite crystals are produced, for example, by the inclusion of an alcohol such as methanol as a component in industrial processes which produce aqueous solutions of alkali metal hydrosulfites. The alcohol supresses the solubility of hydrosulfite and small anhydrous crystals are formed and recovered from the reaction mixtures.

Another process which has been employed is the crystallization of an aqueous solution of alkali metal hydrosulfite containing an alcohol, such as methanol or ethanol. One example of this approach is described in U.S. Pat. No. 3,298,796, issued Jan. 17, 1967 to M. A. van Damme-van Weele et al. In this process, a dilute solution of sodium hydrosulfite is admixed with 20 percent ethanol and the solution crystallized in a vacuum crystallizer in the presence of a thick suspension of sodium dihydrate crystals. In addition to requiring the crystallization to take place under vacuum conditions, the mother liquor recovered contains an alcohol which may have to be removed before recycling the mother liquor to the process for producing the hydrosulfite solution.

A similar process is taught by S. Z. Avedikian in U.S. Pat. No. 2,938,771, published May 31, 1960, where a hydrosulfite-rich solution containing an alcohol is crystallized. Both U.S. Pat. Nos. 3,298,796 and 2,938,771 teach a separation of a slurry of hydrosulfite crystals in a thickener in which a filtrate is returned to the reactors and the thickened crystal slurry fed to a centrifuge with a portion being returned to the crystallizer.

The use of alcohol in these processes suppresses the solubility of alkali metal hydrosulfites as well as the size of the hydrosulfite crystals produced. These small crystals are more difficult to separate from the mother liquor. Extending the period of contact between the crystals and impurities, such as alkali metal thiosulfates contained in the mother liquor, during separation results in excessive hydrosulfite decomposition and increased thiosulfate concentrations. Further, where an alkali metal amalgam is used in the hydrosulfite production process, contamination of the amalgam with alcohol renders the amalgam unsuitable for use in other electrolytic processes.

Recently, a process has been developed for producing high purity solutions of alkali metal hydrosulfites. The process, as described in U.S. Pat. No. 4,590,058, issued May 20, 1986 to D. W. Cawlfield, includes the production of alkali metal hydrosulfite dihydrate crystals which are separated from the process mother liquor. The hydrate crystals of the alkali metal hydrosulfite are dissolved in water to produce a purified solution of alkali metal hydrosulfite.

Hydrate crystals of an alkali metal hydrosulfite are unstable and decompose rather rapidly. Dehydration of the hydrate crystals to anhydrous crystals provides a very stable form of the alkali metal hydrosulfite.

Now it has been discovered that anhydrous crystals of an alkali metal hydrosulfite can be produced having increased crystal size while reducing the concentration of impurities.

These advantages are accomplished in a process for producing an anhydrous alkali metal hydrosulfite which consists essentially of:

(a) feeding an aqueous slurry of an alkali metal hydrosulfite containing dissolved alkali metal hydrosulfite and hydrate crystals to a concentrating zone, (b) admixing a lower alkanol having 1 to about 4 carbon atoms with the aqueous slurry while maintaining the temperature at about $-15°$ C. to about $30°$ C. to convert dissolved hydrosulfute to hydrate crystals and form a concentrated slurry, (c) admixing an alkaline compound with the concentrated slurry to maintain the pH of at least about 7, and (d) conveying the concentrated slurry to a dehydrating zone, and maintaining the temperature of the dehydrating zone at the transition temperature to convert the hydrate crystals to anhydrous crystals of the alkali metal hydrosulfite.

Hydrate crystals of an alkali metal hydrosulfite, such as sodium hydrosulfite or potassium hydrosulfite, can be produced, for example, by several processes including that of U.S. Pat. No. 4,590,058, the entire disclosure of which is hereby incorporated by reference.

In order to simplify the disclosure of the invention, it will be described hereinafter in terms of sodium hydrosulfite dihydrate, a preferred embodiment of alkali metal hydrosulfite hydrate crystals.

In the novel process of the present invention, an alkaline aqueous solution of a dehydrating agent is brought in contact with the sodium hydrosulfite dihydrate crystals to convert the sodium dihydrate crystals to anhydrous crystals of sodium hydrosulfite. To minimize decomposition of sodium hydrosulfite during the dehydration process, the pH of the solution is maintained at at least about 7, and preferably above about 10, for example in the range of from about 11 to about 13, by admixing an alkaline compound such as an alkali metal hydroxide.

The dehydration reaction mixture is maintained at or above the transition temperature, that is the temperature at which, for example, sodium hydrosulfite dihydrate crystals dehydrate and form anhydrous crystals.

As the dehydrating agent in the process of the present invention, any agent may be employed which suppresses the solubility of the sodium hydrosulfite and which is separable from water to permit recovery from the aqueous solution.

For example, suitable as the dehydrating agent in the novel process of the present invention is an aqueous solution of a lower alkanol having 1 to about 4 carbon atoms. Suitable alkanols include methanol, ethanol, propanol, isopropanol, butanol, isobutanol or sec-butanol, with methanol or ethanol being the preferred embodiments. The alkanol is present in the aqueous solution in concentrations of at least 30 percent by weight, for example, from about 30 percent to about 100 percent, and preferably from about 50 percent to about 70 percent by weight.

In one method of operation of the process, sodium hydrosulfite crystals are fed into the aqueous alkanol solution and a slurry formed. The solids loading of the slurry is not critical and can include, for example, loadings in the range of from about 1 to about 60 percent by weight of sodium hydrosulfite dihydrate crystals. During operation of the process, the solids loading should be controlled to maintain steady conditions in the dehydration reaction zone. High solids loading may result in allowing dihydrate crystals to pass through the dehydration zone undehydrated and may also increase decomposition of the sodium hydrosulfite. A low solids loading will result in low production rates and will increase the residence time of the sodium hydrosulfite which may result in an increase in the rate of decomposition. Preferred solids loadings are those in the range of from about 10 percent to about 30 percent, and more preferably at from about 15 percent to about 25 percent.

As stated above, the dehydration reaction slurry is maintained at or above the transition temperature. When using an aqueous alkanol solution where methanol is the lower alkanol, the transition temperature is in the range of from about 54° to about 59° C.

The transition or residence time should be selected to minimize decomposition of the sodium hydrosulfite while allowing suitable time for crystal growth. While transition times of up to 40 minutes may be employed, preferred transition times are in the range of from about 3 to about 10 minutes.

In one embodiment, it has been found that quick chilling of the anhydrous crystals, for example, by washing with cold methanol, reduces formation of thiosulfate as an impurity.

Crystal sizes of the anhydrous sodium hydrosulfite produced by the process of the present invention are in a range which permits easy separation from the mother liquor. For example, suitable crystals include those in the range of from about 100 to about 500 microns. The anhydrous crystals are separated from the mother liquor in a solid-liquid separator using size, density or some other means to separate the crystals from the mother liquor. Suitable separating devices include all types of centrifuges, vacuum filters, pressure filters, filter presses, hydroclones, etc. The mother liquor may be recycled to the dehydration step.

Next, the anhydrous crystals recovered are dried by any commercially available units capable of drying a moderately heat-sensitive material. The unit may employ heat, radiation, or any other suitable means either directly or indirectly to dry the product. An inert atmosphere is preferred but is not required. The dryer should allow a minimum of decomposition and product degradation. The product has a low concentration of impurities such as sodium thiosulfate and is very stable.

In a preferred embodiment of the process, a sodium hydrosulfite dihydrate slurry containing sodium hydrosulfite in both solid and solution phases is first contacted with a lower alkanol solution to convert all of the sodium hydrosulfite present to the solid dihydrate crystal form. The alkanol solution is maintained at a low temperature to minimize decomposition of the hydrosulfite. Suitable temperatures include those in the range of from about −15° C. to about 30° C. The preferred temperature range minimizes decomposition rates and refrigeration costs and is from about 15° C. to about 25° C. When, for example, methanol is the alkanol selected, weight ratios of water to MeOH of from about 25:75 to about 60:40 are maintained in the solution. The crystal slurry produced is conveyed to a solid-liquid separator and sodium hydrosulfite dihydrate crystals are recovered from the alkanol solution. The dihydrate crystals produced are of a high purity as the alkanol solution retains soluble impurities such as sodium thiosulfate.

The dihydrate crystals are then dehydrated by the dehydration process described above. The mother liquor is preferably concentrated to recover the alkanol, for example, by distillation and to isolate undesired impurities for disposal.

The novel process of the present invention results in the production of anhydrous crystals of alkali metal hydrosulfite under conditions which permit the transition of dihydrate crystals to anhydrous crystals to take place Without substantial dissolving or decomposition of the alkali metal hydrosulfite.

The process of the present invention is further illustrated by the following example with no intention of being limited thereby.

EXAMPLE

A slurry of sodium hydrosulfite dihydrate crystals containing 340 g/l of sodium hydrosulfite, 25 g/l of sodium thiosulfate, 40 g/l of sodium bisulfite, and 72 g/l of sodium sulfite was fed to a draft tube crystallizer. Methanol was added in an amount to provide a 50:50 percent weight ratio with the water present.

The reaction mixture was maintained at 15° C. and at a residence time of about 5 minutes and substantially all of the soluble hydrosulfite was converted to dihydrate crystals. The slurry of needle-shaped dihydrate crystals was conveyed to a centrifuge which separated the sodium hydrosulfite dihydrate crystals from the mother liquor, the components having the following analysis:

| Component | Cake Wt. % | Mother Liquor Wt. % |
|---|---|---|
| Sodium Hydrosulfite | 76.6 | 1.8 |
| Sodium Thiosulfate | 0.1 | 1.1 |
| Sodium Bisulfite | 0.1 | 1.7 |
| Sodium Sulfite | 0.2 | 3.3 |
| Water | 19.3 | 42.6 |
| Methanol | 3.7 | 49.5 |

The mother liquor recovered from the centrifuge was fed to a distillation column and the solution distilled to recover about 90 percent of the methanol, the remainder of the liquor being discarded.

The cake of sodium hydrosulfite dihydrate crystals was conveyed to a jacketed draft tube crystallizer. Methanol was added to provide an aqueous methanol solution containing about 55 percent by weight of MeOH.

Sodium hydrosulfite dihydrate crystals were added to the crystallizer at a rate which maintained the solids loading at 18 percent by weight of dihydrate crystals. The temperature of the mixture was maintained in the range of 54° to 59° C. After a residence time of about five minutes, a slurry of anhydrous sodium hydrosulfite crystals was removed from the crystallizer and conveyed to a filter/dryer. The anhydrous crystals were dried under an inert gas and the composition of the product determined as shown in TABLE 1 below:

TABLE I

| Anhydrous Crystal Composition | |
|---|---|
| Component | Average Weight Percent |
| Sodium Hydrosulfite | 95.1 |
| Sodium Thiosulfate | 0.9 |
| Sodium Sulfite | 1.4 |
| Sodium Hydroxide | 1.9 |
| Other | 0.7 |

TABLE I-continued

| Anhydrous Crystal Composition | |
|---|---|
| Component | Average Weight Percent |
| 566H | |

What is claimed is:

1. A process for producing an anhydrous alkali metal hydrosulfite which consists essentially of:
   (a) feeding an aqueous slurry of an alkali metal hydrosulfite consisting essentially of dissolved alkali metal hydrosulfite and hydrate crystals to a concentrating zone,
   (b) admixing a lower alkanol having 1 to about 4 carbon atoms with the aqueous slurry while maintaining the temperature at about $-15°$ C. to about 30° C. to convert dissolved hydrosulfite to hydrate crystals and form a concentrated slurry,
   (c) maintaining the concentrated slurry at a pH of at least about 7, and
   (d) conveying the concentrated slurry to a dehydrating zone, and maintaining the temperature of the dehydrating zone at the transition temperature to convert the hydrate crystals to anhydrous crystals of the alkali metal hydrosulfite.

2. The process of claim 1 in which prior to step (c) a mother liquor containing the lower alkanol is separated from the concentrated slurry.

3. The process of claim 2 in which the mother liquor is distilled to recover the lower alkanol.

4. The proces of claim 1 in which the alkali metal hydrosulfite is sodium hydrosulfite or potassium hydrosulfite.

5. The process of claim 1 in which a transition time of up to about 40 minutes is employed.

6. The process of claim 1 in which the dehydrating agent is an aqueous solution containing at least about 30 percent by weight of the lower alkanol.

7. The process of claim 4 in which the pH is at least about 10.

8. The process of claim 7 in which the alkali metal hydrosulfite is sodium hydrosulfite.

9. The process of claim 6 in which the aqueous solution of lower alkanol contains from about 50 to about 70 percent by weight of alkanol.

10. The process of claim 6 in which the lower alkanol is methanol.

11. The process of claim 10 in which the transition temperature is from about 54° C. to about 59° C.

12. The process of claim 11 in which the transition time is from about 3 to about 10 minutes.

13. A process for producing an anhydrous alkali metal hydrosulfite consisting essentially of:
   (a) admixing an aqueous slurry of an alkali metal hydrosulfite consisting essentially of hydrate crystals of the alkali metal hydrosulfite and dissolved alkali metal hydrosulfite with a lower alkanol having 1 to about 4 carbon atoms while maintaining the temperature at about $-15°$ C. to about 30° C. to convert the dissolved alkali metal hydrosulfite to hydrate crystals of the alkali metal hydrosulfite forming a concentrated slurry,
   (b) maintaining the concentrated slurry at a pH of at least about 7, and
   (c) dehydrating the concentrated slurry at the transition temperature to convert the hydrate crystals to anhydrous crystals of the alkali metal hydrosulfite.

* * * * *